(Model.)

S. C. COLLINS.
CAR COUPLING.

No. 259,821. Patented June 20, 1882.

WITNESSES:
J. D. Garfield
C. Sedgwick

INVENTOR:
S. C. Collins
BY Munn & Co.
ATTORNEYS.

UNITED STATES PATENT OFFICE.

STEPHEN C. COLLINS, OF OREGON, MISSOURI.

CAR-COUPLING.

SPECIFICATION forming part of Letters Patent No. 259,821, dated June 20, 1882.

Application filed April 17, 1882. (Model.)

*To all whom it may concern:*

Be it known that I, STEPHEN C. COLLINS, of Oregon, in the county of Holt and State of Missouri, have invented a new and Improved Car-Coupling, of which the following is a full, clear, and exact description.

In this improved car-coupling the pins are attached to vertically-swinging tumblers, with which there are trip-dogs for setting them up in the open position for allowing the coupling-link to enter and couple self-actingly by tripping said tumblers and letting the pins fall through the link. The tumblers are provided with a lifting-rod by which to raise them without going between the cars. The pin drops through the lower part of the draw-bar where it has support against the draft, and the tumbler drops behind a shoulder of the end of the draw-bar where it has support to relieve its pivot of the draft. The coupling-link is a bar having a hole for each pin, and being constructed with reference to the tumblers and the trip-dogs for automatically coupling therewith, as will be hereinafter described.

Reference is to be had to the accompanying drawings, forming part of this specification, in which similar letters of reference indicate corresponding parts in all the figures.

Figure 1:
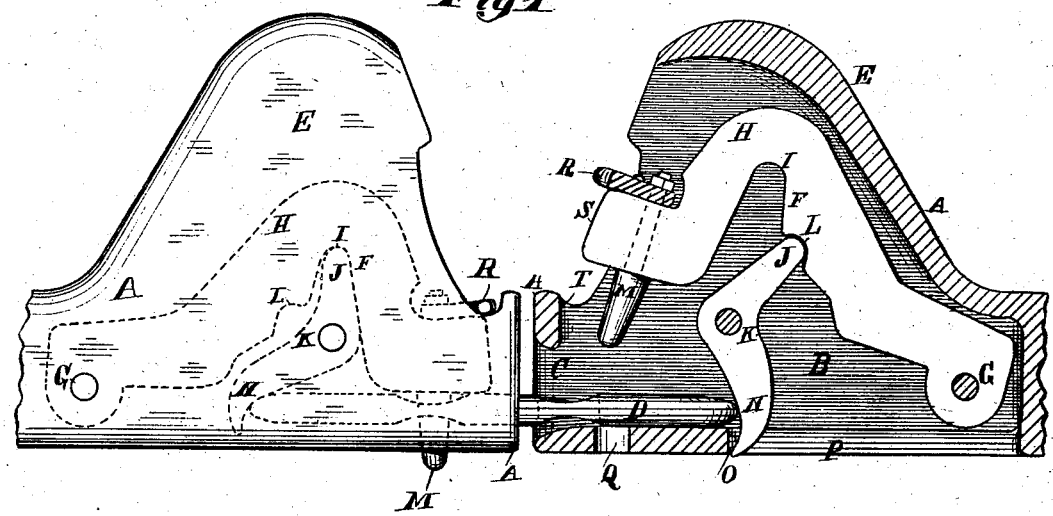
Figure 2:
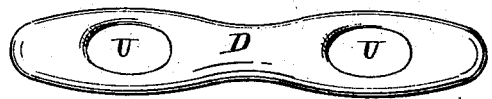
Figure 3:
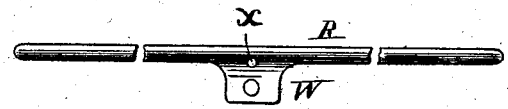

Figure 1 is a side elevation of one of the draw-bars and a sectional elevation of the other. Fig. 2 is a plan view of the coupling bar or link. Fig. 3 is a side view of the lifting-rod of the tumblers.

A represents the heads of the draw-bars, which are cast with a vertical and longitudinal chamber, B, behind the front opening, C, for the link D, said chamber being extended upward within a case, E, cast together with the draw-bar, suitably for the rise and fall of the tumbler H, pivoted at G in the rear of the chamber B, and having the vertical crook F to form the notch I for the arm J of the trip-dog K, which is employed to set the tumbler for coupling automatically in the manner indicated at the right hand of Fig. 1, the tumbler being set with its notch L over the end of arm J, so as to be supported on it and keep the pin M attached to its front end held above the line of the link D, the dog being at the same time so disposed that its arm N bears at O against the shoulder of the slot P in the bottom of the draw-bar behind the hole Q for the coupling-pin, when the end of the link D strikes the dog K on entering, and just as the heads A of the draw-bars come together it trips the arm J out of notch L into the deep notch I, which allows the tumbler and the pin to fall and engage the link and thus couple the car.

The arm N of the dog is made heavier than arm J, so that it will of itself swing down when the tumbler is raised and lodge arm J in notch L for setting the tumbler for self-coupling. The tumbler is to be raised by hand with a lifting-bar, R, reaching outward sufficiently to enable the tumbler to be raised without going between the cars.

It will be seen by the dotted lines in the left hand of Fig. 1 that when the link is coupled the head of the tumbler rests on it, and also the arm N of the dog K in such manner as to effectually hold the projecting end of the link up to the height of the draw-bar of the car to be coupled, so as to insure its entry thereto.

In practice, the tumbler will have a little slack at the pivot G, so that when the draft takes effect on it the head S will draw against the shoulder T, and the pin M will draw against the front side of the hole Q, so as to relieve the pin G.

The link is provided with two holes, V, for the coupling-pins, which have slack enough to allow the draw-heads to touch each other without being crowded against the coupling-pins, and this prevents the link from being pressed back too far in and against the arms N of the setting-dogs.

When it is desired to bump the cars back on a siding without coupling them together, the lifting-rod R may be fastened up to hold the tumbler by a hook or other fastener attached to the upper part of case E or to the body of the car.

The vertical extension of the case E has an opening through the front above the shoulder T, to permit of the connection of the before-described lifting-bar R. Said bar is connected to the pin M by the perforated lug W, and said bar may have a hook or other device connected to it at X, for hanging the tumbler up when it is not required to couple.

In practice I do not confine myself to the exact dimensions and arrangements of the parts of my coupler, as shown in the drawings; but these may be varied within the scope of my invention to suit different constructions of cars, as may be required.

The covering of the case E may be dispensed with, and suitable devices can be attached to the bar R for operation of the same from the top of freight-cars. The pivoted end of the tumbler G can be placed as far under the car as may be needful, and also the coupling-pin M may be so secured to the tumbler as to allow play in the said coupling-pin.

The opening C in the front of the draw-head is to be made flaring to insure the entry of the coupling-pin with draw-heads standing at different levels.

Having thus described my invention, what I claim as new, and desire to secure by Letters Patent, is—

1. A draw-bar formed of the head A and case E, with the chamber B and opening C, to adapt it to receive a tumbler and trip-dog, as shown and described.

2. The tumbler H, pivoted at G in the rear of draw-head chamber B, and having notches I L, in combination with the lever trip-dog having the arms J N, arranged as shown and described.

3. The draw-bar having vertically-extending tumbler-chamber B behind the opening C for the link, with front opening into said chamber above the shoulder T, and provided with tumbler H, having lifting-bar R, connected with said tumbler through said opening, substantially as described.

4. The combination of lifting-rod R, with the tumbler H, and coupling-pin M, substantially as described.

5. The setting and tripping dog K, having setting-arm J, and overbalancing-arm N, for self-setting and for tripping said arm J, and being combined with tumbler H, substantially as described.

STEPHEN C. COLLINS.

Witnesses:
W. R. SPRINGER,
HENRY SHUTTS.